United States Patent
Ito et al.

(10) Patent No.: US 6,416,174 B1
(45) Date of Patent: Jul. 9, 2002

(54) INK COMPOSITION, PATTERN FORMING METHOD, AND COLOR FILTER

(75) Inventors: Takeo Ito, Kumagaya; Kazuo Sakai, Kawanishi; Hiroyuki Nakazumi, Kawachinagano, all of (JP)

(73) Assignees: Kabushiki Kaisha Toshiba, Kawasaki; Fuji Pigment Co., Ltd., Kawanishi, both of (JP)

( * ) Notice: Subject to any disclaimer, the term of this patent is extended or adjusted under 35 U.S.C. 154(b) by 0 days.

(21) Appl. No.: 09/250,483

(22) Filed: Feb. 16, 1999

Related U.S. Application Data

(62) Division of application No. 08/781,727, filed on Jan. 10, 1997.

(30) Foreign Application Priority Data

Jan. 11, 1996 (JP) ............................................. 8-003372

(51) Int. Cl.[7] .............................................. G01D 11/00
(52) U.S. Cl. ........................................ 347/100; 347/96
(58) Field of Search ............................ 347/100, 96, 101

(56) References Cited

U.S. PATENT DOCUMENTS

| | | | | |
|---|---|---|---|---|
| 3,965,278 A | | 6/1976 | Duinker et al. ............. 313/466 |
| 4,957,553 A | * | 9/1990 | Koike et al. ............. 106/31.58 |
| 5,079,214 A | * | 1/1992 | Long et al. ................. 428/195 |
| 5,180,425 A | | 1/1993 | Matrick et al. ........... 106/22 R |
| 5,302,197 A | | 4/1994 | Wickramanayke et al. ... 106/22 H |
| 5,376,169 A | | 12/1994 | Horomi et al. ............. 523/160 |
| 5,401,303 A | | 3/1995 | Stoffel et al. ............ 106/31.86 |
| 5,693,127 A | * | 12/1997 | Nigam et al. ............... 347/100 |
| 5,700,609 A | * | 12/1997 | Matsuda et al. .............. 430/27 |

FOREIGN PATENT DOCUMENTS

| | | | |
|---|---|---|---|
| EP | 622 429 | 11/1994 | |
| EP | 688 835 | 12/1995 | |
| EP | 0735120 A2 | * 10/1996 | ........... C09D/11/00 |
| JP | 59-75205 | 4/1984 | |
| JP | 05224007 A | * 9/1993 | ............ G02B/5/20 |
| JP | 05224008 A | * 9/1993 | ............ G02B/5/20 |
| JP | 7-17911 | 7/1995 | |

OTHER PUBLICATIONS

Translation of Selected Portions of JP 7–179711.

* cited by examiner

Primary Examiner—John Barlow
Assistant Examiner—M Shah
(74) Attorney, Agent, or Firm—Finnegan, Henderson, Farabow, Garrett & Dunner, L.L.P.

(57) ABSTRACT

An ink composition having a pigment in its droplets, which are adhered onto the surface such as glass, ceramics or polyester resins of a base material, always dispersed uniformly is ejected from a nozzle by an ink-jet method to directly form a prescribed pattern of a colored layer of a color filter on the surface of the base material.

18 Claims, 2 Drawing Sheets

INK COMPOSITION, PATTERN FORMING METHOD, AND COLOR FILTER

This is a division of application Ser. No. 08/781,727, filed Jan. 10, 1997, which is incorporated herein by reference.

BACKGROUND OF THE INVENTION

1. Field of the Invention

The present invention relates to an ink composition, a pattern forming method and a color filter, and particularly to an ink composition used to form a pattern by an ink-jet method, a pattern forming method which uses the above ink composition, and a color filter which is produced by the pattern forming method using the above ink composition.

2. Description of the Related Art

The pattern forming method according to the ink-jet method sprays droplets of an ink composition onto a base material by various types of ink composition ejecting methods such as an electrostatic attraction method, a method which employs a piezoelectric element to mechanically vibrate or bias ink, or a method of heating to foam ink and using a pressure by the foamed ink to form a pattern on the surface of the base material. And, the pattern forming method according to the ink-jet method has advantages that a pattern can be formed quickly without involving production of large noise, and a multi-colored pattern can be formed easily. Therefore, it is attracting attention in many fields.

Meanwhile, color filters h are used for display units such as a CRT, a liquid crystal display and a plasma display, or a solid state image pickup device and the like have been produced by various types of methods such as a pigment dispersion method, a dye dispersion method, and a dyeing method.

For example, Japanese Patent Laid-Open Publication No. Hei 7-179711 describes a method of producing a fluorescent film with a filter by forming a patterned photo absorption layer on the inner face of a face plate, applying a pigment dispersed solution and a phosphor slurry, and exposing through a mask and developing. And, Japanese Patent Laid-Open Publication No. Sho 59-75205 describes a method of producing a color filter by forming a colored layer on a substrate by the ink-jet method.

However, the method of producing a fluorescent film with a filter described in Japanese Patent Laid-Open Publication No. Hei 7-179711 has a disadvantage that the production cost is high because it involves many steps to produce the fluorescent film, and the application of a pigment dispersed solution and a phosphor slurry and the exposure through a mask and development are required for each color. And, the method of producing a color filter described in Japanese Patent Laid-Open Publication No. Sho 59-75205 which forms a colored layer on a substrate by the ink-jet method has disadvantages that a dispersion preventive pattern or a wettability improver must be formed on a glass substrate in advance, increasing facilities investment and the number of processes, also increasing the production cost, and lowering a production yield.

The present invention has been completed in view of the above circumstances, and aims to provide an ink composition which can form a fine pattern on the surface of glass, ceramics or polyester resins by the ink-jet method without requiring to form a wettability improver.

The present invention also aims to provide a pattern forming method which can easily form a fine pattern efficiently on the surface of a glass substrate or the like, and does not involve many processes or facilities investment, so that the formed pattern excels in reliability and economy.

Besides, the present invention aims to provide a color filter having a pattern which excels in optical resistance and water resistance and has high reliability in practical use, and which also excels in economy.

SUMMARY OF THE INVENTION

An ink composition according to the present invention is controlled to keep maximum the ratio (V/S) of the volume (V) of a system which consists of a solvent, a pigment dispersed into the solvent and a dispersant which is dispersed into the solvent to enhance an affinity between the solvent and the pigment; and the surface area (S) of an interface of the system produced on a boundary between the system and a gas phase.

And, an ink composition according to the present invention has a system which consists of a solvent, a pigment dispersed into the solvent and a dispersant which is dispersed into the solvent to enhance an affinity between the solvent and the pigment, and the system has (1) a surface tension of 20.0 dyn/cm to 50.0 dyn/cm at 25° C., and (2) a viscosity of 1.5 cp to 20.0 cp at 25° C.

Besides, an ink composition according to the present invention contains a solvent, a pigment dispersed into the solvent, a dispersant which is dispersed into the solvent to enhance an affinity between the solvent and the pigment, and an additive which is dispersed into the solvent to control free energy of an interface.

A pattern forming method according to the invention has a step of ejecting from a nozzle by an ink-jet method droplets of an ink composition of which the ratio (V/S) between the volume (V) of a system which consists of a solvent, a pigment dispersed into the solvent and a dispersant which is dispersed into the solvent to enhance the affinity between the solvent and the pigment; and the surface area (S) of the interface of the system produced on at the boundary between the system and a gas phase is controlled to be kept at a maximum, a step of adhering the droplets onto the surface of a base material, and a step of adhering the pigment contained in the droplets onto the base material.

And, a pattern forming method according to the invention has a step of ejecting from a nozzle by an ink-jet method droplets of an ink composition having a system which consists of a solvent, a pigment dispersed into the solvent and a dispersant which is dispersed into the solvent to enhance an affinity between the solvent and the pigment, and which has (1) a surface tension of 20.0 dyn/cm to 50.0 dyn/cm at 25° C. and (2) a viscosity of 1.5 cp to 20.0 cp at 25° C., a step of adhering the droplets onto the surface of a base material, and a step of adhering the pigment contained in the droplets onto the base material.

Furthermore, a pattern forming method according to the invention has a step of ejecting from a nozzle by an ink-jet method droplets of an ink composition containing a solvent, a pigment dispersed into the solvent, a dispersant which is dispersed into the solvent to enhance an affinity between the solvent and the pigment, and an additive which is dispersed into the solvent to control free energy of an interface, a step of adhering the droplets onto the surface of a base material, and a step of adhering the pigment contained in the droplets onto the base material.

A color filter according to the invention has a base material and a colored layer which is formed of a pigment adhered to the surface of the base material by an ink-jet method.

Generally, to form a pattern of picture elements for a color filter by an ink-jet method, when a base material has a surface (to-be-colored layer) of glass, ceramics or a film material made of polyester resin or the like which is different from fiber of paper or the like, a conventional ink composition is not adequately adhered to the surface of such a base material, and the ink composition is repelled or spreads on the surface of the base material. And, since the adhesion of a coloring matter to the surface of the base material is weak, it is easily separated from the surface of the base material, and the formed pattern is broken in a short period. The base material used herein generally means those having a to-be-colored layer surface, onto which the coloring matter of the ink composition is adhered, with a structure of glass, ceramics or a film made of polyester resin or the like which is different from fiber of paper or the like. Therefore, the base materials belonging to such a category can be a glass substrate or a ceramics substrate; various types of film materials such as polyester resin, diacetate resin, triacetate resin, acrylic resin, polycarbonate resin, polyvinyl chloride resin, polyimide resin, cellophane or celluloid; and coated paper of which the surface is coated with organic polymer compounds such as polyamide or polyester.

FIG. 2A and FIG. 2B are schematic views showing a process that an ink composition is adhered to the surface of a base material such as a glass substrate or ceramics substrate and a solvent evaporates from a droplet of the ink composition.

Specifically, when an ink composition 203 is adhered to a surface 202 of a base material 201, the surface area (S) of an interface 204, which is in contact with a gas phase, of the ink composition 203 is kept to have the minimum ratio (S/V) to the volume (V) of the ink composition 203, in other words, the ratio (V/S) between the volume (V) of the ink composition 203 and the surface area (S) of the interface 204 is controlled to be kept at a maximum as shown in FIG. 2A. But, as the solvent evaporates from the ink composition, the minimum ratio between the surface area of the interface 204, which is in contact with the gas phase, of the ink composition 203 and the volume of the ink composition 203 cannot be kept, and the ratio of the surface area of the interface 204, which is in contact with the gas phase, of the ink composition 203 to the volume of the ink composition increases as shown in FIG. 2B. More specifically, the middle of the ink composition 203 adhered to the surface 202 of the base material 201 sinks toward the base material 201, and the ratio of the surface area of the interface 204, which is in contact with the gas phase, of the ink composition 203 to the volume of the ink composition increases as shown in FIG. 2B. And, a pigment 205 contained in the ink composition 203 is concentrated toward portions (circumference) 206a and 206b of the interface of the ink composition 203, and the uniform dispersion of the pigment 205 within the ink composition 203 is lost. Therefore, a pattern formed by the adhesion of the pigment 205 to the surface 202 of the base material 201 has light and dark portions. And, it is hard to stably form a good pattern because the adhesive force to the surface of the substrate is partly different.

The inventors have repeated various experiments, and finally found an ink composition which forms a good pattern without involving the above-described disadvantages by selecting types and particle diameters of a pigment as the coloring matter, a dispersant, and a solvent. In the experiments, respective steps shown in Table 1 were taken into account.

TABLE 1

|  | Conventional ink composition | Ink composition to provide good pattern |
|---|---|---|
| A. Surface of base material | Droplets deform | Droplet shape is substantially constant |
| B. Solvent evaporates | Further deforms | Droplet shape is not deformed heavily |
| C. Most solvent has evaporated | Weak adhesion of pigment | Pigment adheres firmly to base material |

It is apparent from Table 1 that in order to form a good pattern, when the solvent evaporates from the ink composition adhered to the surface of the base material, the shape of droplets of the ink composition on the surface of the base material must be kept to have the base material wet with the droplets. And, the pigment contained in the ink composition is required to have an affinity for the surface of the base material and a high adhesive force.

To meet such conditions, various experiments have been made to find materials for the ink composition, and the results obtained are shown in Table 2 and Table 3. Symbols ○, Δ and × in Table 2 and Table 3 indicate a good level, a practical level and an unpractical level, respectively.

TABLE 2

| Materials for ink composition | | State of ink composition adhered to base material | | |
|---|---|---|---|---|
| No. | Solvent | Dispersant | Repellency | Spreading | Adhesive force |
| 1 | Water | Nonionic surface active agent | Δ ~ o | X | X |
| 2 | Water | Anionic surface active agent | Δ ~ o | X | X |
| 3 | Water | Cationic surface active agent | Δ ~ o | X | X |

TABLE 3

| | Materials for ink composition | | | State of ink composition adhered to base material | | |
|---|---|---|---|---|---|---|
| No. | Solvent | Dispersant | Additive | Repelling | Spreading | Adhesive force |
| 1 | Alcohol | Polyvinyl butyral | Polycarboxylic acid | o | o | o |
| 2 | Alcohol | Polyvinyl pyridine | Silicone oil | o | o | o |

TABLE 3-continued

| | Materials for ink composition | | | State of ink composition adhered to base material | | |
|---|---|---|---|---|---|---|
| No. | Solvent | Dispersant | Additive | Repelling | Spreading | Adhesive force |
| 3 | Alcohol | Polyvinyl alkyl pyrrolidone | Acrylic resin | ○ | Δ | Δ |
| 4 | Alcohol | Acrylic resin | Silicone resin | ○ | Δ~○ | ○ |
| 5 | Methyl ethyl ketone/toluene | Polyester resin | Polycarboxylic acid | ○ | ○ | ○ |
| 6 | Methyl ethyl ketone/toluene | Polyurethane resin | Silicone resin | ○ | Δ | ○ |
| 7 | Methyl ethyl ketone/toluene | Acrylic resin | Modified polysiloxane copolymer | ○ | Δ | ○ |
| 8 | Water | Acrylic resin (Base material temperature: 65° C.) | Fluorine-based surface active agent | ○ | ○ | ○ |
| 9 | Water | Acrylic resin | Polyether modified silicone oil | ○ | ○ | ○ |
| 10 | Water | Acrylic resin | Sodium dialkyl sulfosuccinate | ○ | ○ | ○ |
| 11 | Water | Polyvinyl alkyl pyrrolidone | Polyether modified silicone oil | ○ | ○ | ○ |
| 12 | Water | Polyvinyl alkyl pyrrolidone | Polyether modified silicone oil | ○ | ○ | ○ |

Table 2 shows the results obtained when conventional ink compositions were adhered to a glass substrate, and Table 3 shows the results also obtained when the ink composition of the present invention was adhered to a glass substrate. FIG. 1B and FIG. 1D are photographs taken through a light microscope to show a state that a conventional ink composition is adhered to a glass substrate, and FIG. 1A and FIG. 1C are photographs taken through a light microscope to show a state that the ink composition of the invention is adhered to a glass substrate. FIG. 1A and FIG. 1B show a state that droplets are widely spaced as an experiment in order to clarify the effects of the ink composition of the present invention, and FIG. 1C and FIG. 1D show an example of drawing a line by continuously ejecting. It is apparent from FIG. 1A and FIG. 1B that the ink composition of the present invention has its all droplets arranged in good order with their shapes kept same, but the droplets of the conventional ink composition are deformed and not arranged in good order. And, it is apparent from FIG. 1C and FIG. 1D that the center of the line formed of the conventional ink composition has a portion lighter than its surroundings. In other words, it is apparent from FIG. 1A to FIG. 1D that the ink composition according to the invention can form a good pattern stably on the surface (a to-be-colored layer) of the base material which is of the glass substrate and different from fiber of paper or the like. The same result can also be obtained when the surface of the basic material is a ceramics substrate or a film made of polyester resin or the like.

Now, the ink composition of the present invention will be described in detail.

The ink composition of the present invention contains a solvent, a pigment, and a dispersant which enhances the dispersion of the pigment into the solvent. By appropriately controlling the types, amounts and component ratios of the solvent, pigment and dispersant, after adhering droplets of the ink composition onto the surface of a base material, the ratio (S/V) of the surface area (S) of the interface, which is in contact with the gas phase, of the droplets to the volume (V) of the droplets is kept minimum, in other words, the ratio (V/S) between the volume (V) of the droplets and the surface area (S) of the interface is kept maximum while the solvent is evaporating from the droplets. Therefore, while the solvent is evaporating from the droplets, the pigment contained in the droplets is kept uniformly dispersed within the droplets. And, when the ink composition has physical properties such as a surface tension of 20.0 dyn/cm to 50.0 dyn/cm at 25° C. and a viscosity of 1.5 cp to 20.0 cp at 25° C., in a process that the solvent is evaporating from the droplets after adhering onto the surface of the base material, the ratio (S/V) of the surface area (S) of the interface, which is in contact with the gas phase, of the droplets to the volume (V) of the droplets can be kept minimum, in other words, the ratio (V/S) between the volume (V) of the droplets and the surface area (S) of the interface can be kept maximum, and the pigment contained in the droplets can be kept uniformly dispersed within the droplets. Besides, the ink composition of the invention contains a solvent, a pigment, and a dispersant which enhances the dispersion of the pigment into the solvent, and an additive can be added in addition to the solvent, pigment and dispersant in order to keep the ratio (S/V) of the surface area (S) of the interface, which is in contact with the gas phase, of the droplets to the volume (V) of the droplets minimum, in other words, keep maximum the ratio (V/S) between the volume (V) of the droplets and the surface area (S) of the interface in a process that the solvent is evaporating from the droplets after adhering the ink composition in the form of droplets onto the surface of the base material, and also to control the ink composition to have physical properties such as a surface tension of 20.0 dyn/cm to 50.0 dyn/cm at 25° C. At this time, the physical properties of the ink composition is adjusted to have a viscosity of 1.5 cp to 20.0 cp at 25° C. Therefore, the ink composition according to the invention can form a good pattern stably without causing light and dark portions or a partly different adhesive force of the pigment.

In the ink composition according to the invention, the affinity of the solvent for the surface of the base material and its evaporation rate have a significant effect on steps A and B in Table 1. In other words, to accurately position the ink composition on the surface of the base material, the solvent needs to have an affinity for the surface of the base material to obtain appropriate wettability and an appropriate evaporation rate as well.

To meet such conditions, the solvent for the ink composition of the invention can be a mixture of water and various types of organic solvents to be used solely or as a mixture. Preferably usable organic solvents are at least one member selected from a group consisting of alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols containing alkylene groups of two to six carbon atoms such as ethylene glycol, propylene glycol, butylene glycol, triethylene glycol, 1,2,6-hexanetriol, thiodiglycol, hexylene glycol, and diethylene glycol; lower alkyl ethers of polyhydric alcohol such as ethylene glycol methyl ether, ethylene glycol ethyl ether, triethylene glycol monomethyl ether, and triethylene glycol monoethylene ether; and esters such as ethyl acetate and butyl acetate. To use a plurality of solvents in a mixed form, a combination and a mixing ratio of the solvents are determined in a range that the properties of the ink composition are not deteriorated. The ink composition using water only as the solvent is defined as a water-based ink composition, and one using an organic solvent as the solvent is defined as a solvent-based ink composition.

And, to stably form a good pattern without causing light and dark portions or a partly different adhesive force of the pigment, the pigment for the ink composition of the invention is desired to have an average particle diameter of 0.001 $\mu$m to 0.30 $\mu$m, preferably 0.05 $\mu$m to 0.15 $\mu$m, in view of the transparency of the pattern to be formed, and 0.5 $\mu$m to 50 $\mu$m, preferably 1 $\mu$m to 20 $\mu$m in view of securing a luminous efficacy for a phosphor. The average particle diameter is used to indicate as a diameter of the smallest sphere having the same surface area.

The pigment for the ink composition of the invention can be various types depending on where it is used. And examples include inorganic pigments such as carbon black, graphite black, iron black, Cu—Fe—Mn black, Co—Fe—Cr black, Cu—Cr—Mn black, titanium black, manganese black, cobalt black, ultramarine blue, cobalt blue, red oxide, cadmium red, cobalt green, sulfide phosphor, rare earth oxide phosphor, and rare earth oxysulfide phosphor; and organic pigments such as azo-based pigment, phthalocyanine-based pigment, indigo-based pigment, anthraquinone-based pigment, perylene-based pigment, perinone-based pigment, dioxazine-based pigment, quinacridone-based pigment, isoindorinone-based pigment, phthalone-based pigment, methine-azomethine-based pigment, and condensed polycyclic pigment. And, these pigments can be used solely or in a mixed form. To disperse an organic pigment into the solvent-based ink composition, a combination of the organic solvent and the organic pigment shall be selected so that the organic pigment does not dissolve into the organic solvent.

When the ink composition of the invention is to be applied for a color filter for the LCD, it is preferable to use copper phthalocyanine blue as a blue pigment, dioxazine violet as a purple pigment, anthraquinone red or perylene red as a red pigment, isoindorine yellow, benzidine yellow or isoindorinone yellow as a yellow pigment, phthalocyanine green as a green pigment, and carbon black, iron black, Cu—Fe—Mn black, Co—Fe—Cr black or Cu—Cr—Mn black as a black pigment. And, when the ink composition of the invention is to be applied for a color filter for a color image receiving tube/PDP, it is preferable to use ultramarine blue or cobalt blue as a blue pigment, red oxide or cadmium red as a red pigment, cobalt green as a green pigment, and carbon black, iron black, graphite black, titanium black or cobalt black as a black pigment. Furthermore, when the ink composition of the invention is to be applied for C-CRT/PDP phosphor picture elements, it is preferable to use Zn:Ag as a blue-luminous phosphor, $Y_2O_2S$:Eu or $Y_2O_3$:Eu as a red-luminous phosphor, ZnS:Cu, ZnS:Cu or Au as a green-luminous phosphor.

Besides, the dispersant for the ink composition of the invention must be dispersed into the solvent so that it is adsorbed to the pigment to prevent the pigments from coagulating mutually, and it is also required to have a high affinity for a glass substrate. The dispersant which is adsorbed into the surface of the pigment contained in the ink composition serves to uniformly disperse the pigment into the ink composition, and also firmly adheres the pigment onto the surface of the base material. Therefore, the dispersant is related to step A in Table 1 and has a significant effect on step C.

To meet the above-described conditions, the dispersant for the ink composition of the invention is determined in view of combinations of the above-described ink composition types/pigments as required. Specifically, for a combination of the water-based ink composition/organic pigment, the dispersant usable can be, for example, acrylic resin, polyvinyl acrylic pyrrolidone and polyvinyl alkyl pyrrolidone. Similarly, the dispersant suitably usable is acrylic resin, polyvinyl alkyl pyrrolidone and the like when a combination of the ink composition type and the pigment is a water-based/inorganic pigment; the dispersant is polyvinyl butyral, acrylic resin, polyvinyl pyridine, polyamide resin, phenol resin, polyvinyl acrylic pyrrolidone, polyurethane resin and polyester resin when the combination is a solvent-based/organic pigment; and the dispersant is polyvinyl butyral, acrylic resin and polyvinyl acrylic pyrrolidone when the combination is a solvent-based/inorganic pigment. When an organic solvent is to be used as the solvent in the ink composition of the present invention, it is more preferable to use alcohols. When alcohols are used as the organic solvent, the dispersant suitably usable includes polyvinyl butyral, acrylic resin, polyvinyl pyridine, polyamide resin, phenol resin or polyvinyl acrylic pyrrolidone when the pigment is an organic pigment. On the other hand, when an inorganic pigment is to be used, polyvinyl butyral, acrylic resin or polyvinyl acrylic pyrrolidone can be used suitably.

Furthermore, the ink composition of the invention may contain an additive as a component for the ink composition in order to keep the ratio (S/V) of the surface area (S) of the interface, which is in contact with the gas phase, of the droplets to the volume (V) of the droplets minimum, in other words, keep maximum the ratio (V/S) between the volume (V) of the droplets and the surface area (S) of the interface in a process that the solvent is evaporating from the droplets after adhering the ink composition in the form of droplets onto the surface of the base material. When the additive is used, the physical properties of the ink composition can be controlled to have a surface tension of about 20.0 dyn/cm to about 50.0 dyn/cm at 25° C.

The additive for the ink composition of the invention is suitably determined according to the above-described types of the ink composition. Specifically, when the ink composition is water-based, the additive preferably usable is at least one member selected from a group consisting of sodium dialkyl sulfosuccinate, fluorine-based surface active agent, and polyether modified silicone oil. And, when the ink composition is solvent-based, the additive preferably usable is at least one member selected from a group consisting of silicone resin, acrylic resin, modified polysiloxane copolymer, polycarboxylic acid, polyester carboxylate, and unsaturated polycarboxylic acid.

And, as to the ratio of the pigment in the ink composition, it is 1 to 30 parts by weight, and preferably 3 to 15 parts by weight, to 100 parts by weight of the solvent to prevent a nozzle from being clogged by the ink composition and in view of an optical density (OD) of the pattern to be formed.

On the other hand, it is preferable that the dispersant is 1 to 100 parts by weight and the additive is 1 to 30 parts by weight with respect to 100 parts by weight of the pigment. It is more preferable that the dispersant is 10 to 30 parts by weight and the additive is 3 to 10 parts by weight with respect to 100 parts by weight of the pigment.

When the dispersant is less than 1 part by weight to 100 parts by weight of the pigment, the dispersion of the pigment is degraded, causing it difficult to obtain the ink composition in which the pigment is uniformly dispersed. And, when the dispersant exceeds 100 parts by weight to 100 parts by weight of the pigment, the ink composition has a high viscosity, and the ink is not ejected uniformly from a nozzle in the ink-jet method, so that it is difficult to form a good pattern.

And, when the additive is less than 1 part by weight and exceeds 30 parts by weight with respect to 100 parts by weight of the pigment, in a process that the solvent is evaporating from the droplets after adhering the ink composition in the form of droplets onto the surface of the base material, it is difficult to control to minimize the ratio (S/V) of the surface area (S) of the interface, which is in contact with the gas phase, of the droplets to the volume (V) of the droplets, in other words, maximize the ratio (V/S) of the volume (V) of the droplets to the surface area (S) of the interface.

In addition, to the ink composition of the invention, it is possible to add various types of components in a range not deteriorating the properties of the ink composition as required, such as a pH adjustor, a mildewproofing agent, a chelating agent or a reducing agent.

A pattern forming method according to the present invention uses the above-described ink composition to form a pattern on the surface of a base material by the ink-jet method. In the pattern forming method according to the present invention, the ink-jet method for ejecting the ink composition may be any method which can adhere the droplets of the ink composition onto the surface of a base material by effectively ejecting the ink composition from a nozzle. Suitably usable examples of the ink-jet method which ejects the ink composition include an electrostatic attraction method which applies an intense electrical field between a nozzle and an accelerating electrode provided several millimeters before the nozzle to change the ink composition to particles and extract successively from the nozzle and gives an information signal to deflecting electrodes while the extracted ink composition is flying between the deflecting electrodes to form a pattern; a method which applies a high pressure to ink by a small pump and mechanically vibrates a nozzle by a quartz oscillator or the like to forcedly eject the droplets of the ink composition, electrically charges the ejected droplets according to an information signal when they are ejected, and allows the charged droplets between deflecting electrode plates to deflect them according to a charged level, thereby forming a pattern; a method which gives an electrical signal to a piezoelectric element to cause a mechanical displacement to apply a pressure to the ink composition, and eject the droplets of the ink composition from a nozzle; and a method which applies thermal energy to the ink composition to cause a sharp volume change in the ink composition to eject the droplets of the ink composition from a nozzle.

Furthermore, in the case of forming a pattern of picture elements for a color filter, it is desired to control the amount of the droplets of the ink composition to be adhered to the surface of a base material. Specifically, if the amount of the droplets of the ink composition to be adhered to the surface of the base material is small, the amount of the pigment adhered to the surface of the base material is small, so that the optical density (OD) of the pattern formed is low, and it is hard to obtain prescribed optical properties. And, to remedy such a disadvantage, the amount of the pigment contained in the ink composition may be increased, thereby improving the optical density (OD) of the pattern. However, doing so makes it difficult to keep the properties of the ink composition and the nozzle tends to be clogged with the ink composition. Thus, the disadvantages cannot be remedied practically. On the other hand, if the amount of the droplets of the ink composition to be adhered to the surface of a base material is large, even if the amount of the pigment contained in the ink composition is decreased, the solvent contained in the ink composition is slow to evaporate in a moist atmosphere in the rainy season or the like and in a low-temperature environment in winter or the like, so that the adhesion of the pigment onto the surface of the base material is lowered, and it is hard to form a good pattern stably.

When a water-based ink composition is used in the pattern forming method according to the invention, it is desired to keep the surface of the base material, to which the droplets of the ink composition are adhered, at 20° C. to 120° C. in view of controlling the evaporation rate of the solvent water.

The color filter according to the present invention has a base material and a colored layer which has a pigment adhered to the surface of the base material by the ink-jet method. And, this base material can be the above-described various types of base materials. Their examples include a glass substrate or a ceramics substrate; various types of film materials such as polyester resin, diacetate resin, triacetate resin, acrylic resin, polycarbonate resin, polyvinyl chloride resin, polyimide resin, cellophane or celluloid; and coated paper of which the surface is coated with organic polymer compounds such as polyamide or polyester. And, they can be applied for a display unit such as LCD, CRT or PDP, a wafer having a solid state image pickup device such as the light receiving face of a camera tube, CCD, BBD, CID or BASIS, and a contact image sensor using a thin film semiconductor. And, the pigment which forms the colored layer on the surface of the base material can be the above-described various types of pigments.

The colored layer for the color filter according to the present invention is formed by adhering the above-described ink composition onto the surface of the base material by the ink-jet method and adhering the pigment contained in the ink composition onto the surface of the base material. The thickness of the colored layer of the color filter is determined according to a desired spectral characteristics, but generally desired to be about 0.01 to 5 $\mu$m.

The colored layer itself for the color filter according to the invention has a sufficient durability, but to protect the colored layer from various environmental conditions, a resin of polyamide, polyimide, polyurethane, polycarbonate or silicone or an inorganic film of $Si_3N_4$, $SiO_2$, SiO, $Al_2O_3$ or $Ta_2O_3$ can be formed as a protective layer on the surface of the colored layer by an application method such as spin coating or roll coating or a deposition method. When the provided protective layer is oriented, it can be applied to LCD easily.

DESCRIPTION OF THE PREFERRED EMBODIMENTS

Figure 1A:
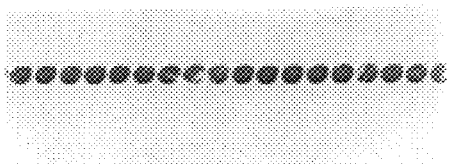
FIG. 1A is a photograph taken through a light microscope to show a state that the ink composition of the invention is adhered to a glass substrate.
Figure 1B:
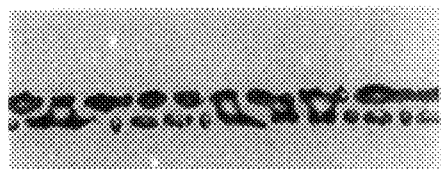
FIG. 1B is a photograph taken through a light microscope to show a state that a conventional ink composition is adhered to a glass substrate.
Figure 1C:
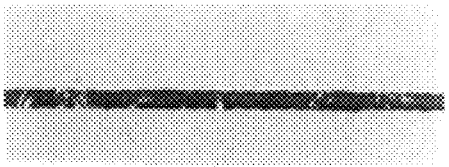
FIG. 1C is a photograph taken through a light microscope to show a state that the ink composition of the invention is adhered to a glass substrate.
Figure 1D:
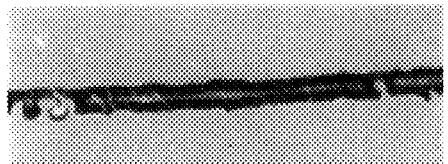
FIG. 1D is a photograph taken through a light microscope to show a state that a conventional ink composition is adhered to a glass substrate.
Figure 2A:
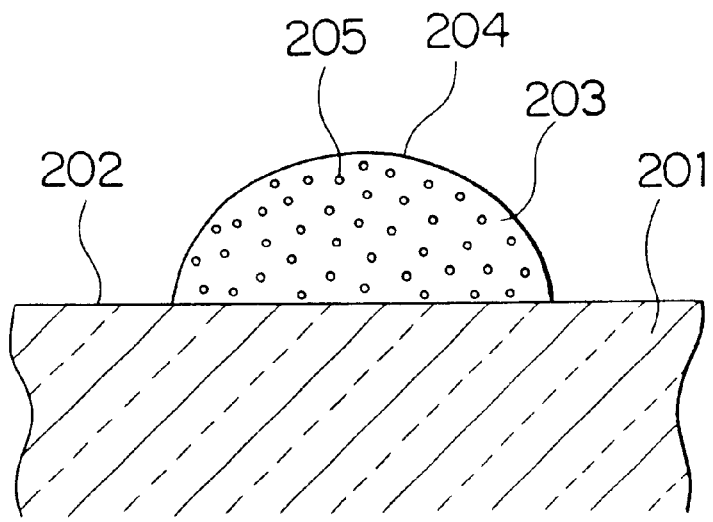
FIG. 2A is a schematic view showing a state that an ink composition is adhered to the surface of a glass substrate or ceramics substrate.
Figure 2B:
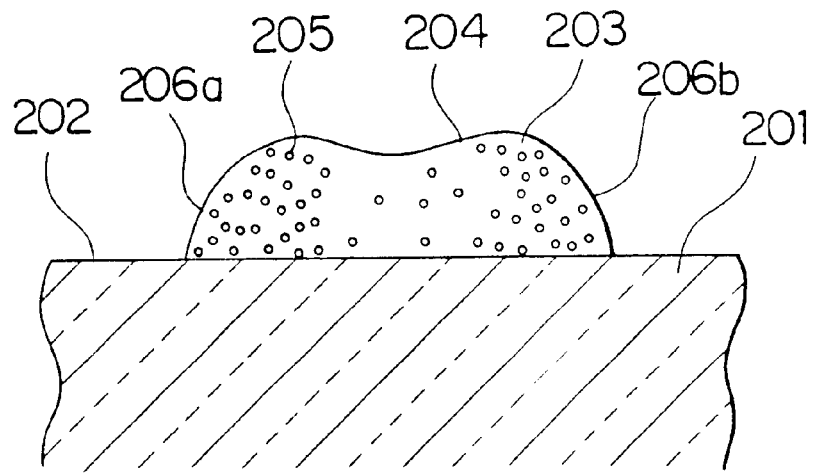
FIG. 2B is a schematic view showing a state that a solvent is evaporating from a droplet of the ink composition.

Embodiments of the invention will be described in detail with reference to the accompanying drawings. In the following embodiments, the symbol "%" indicates a percent by weight.

Embodiment 1

In accordance with compositions A to C shown in Table 4, respective components were mixed and stirred in a stirring bath adjusted to 20° C., and passed through a filter having a pore diameter of 0.5 μm to prepare the ink compositions A to C. The pigment in the ink compositions A to C has an average particle diameter of about 0.1 μm. And, Table 5 shows viscosities and surface tensions of the ink compositions A to C at 25° C. Solmix AP-4 is sold by Nippon Kasei Chemical Co., Ltd.

A glass substrate (with black matrix formed) for the display of LCD was mounted on a piezoelectric type ink-jet printer (MJ-800C; Seiko Epson Corp.; 720 dpi), and a color filter was produced using the ink compositions A to C.

And, the obtained color filter had a good pattern with a black matrix (BM) width of about 40 μm and a pattern width of about 140 μm of each formed colored layer. On this color filter, the maximum difference among pattern widths of the formed colored layer was about 10 μm.

Adhesion between the glass substrate and the each colored layer was good, and heat resistance, cold resistance and chemical resistance were equal to those of the colored layer of a conventional color filter formed by a dyeing method, a pigment dispersing method, an electrodeposition method or a printing method. Besides, optical properties of the colored layer were also same to those of the colored layer of the conventional color filter.

The cost of forming the colored layer was about one fifth of the cost of forming the colored layer of the conventional color filter.

Embodiment 2

In accordance with compositions D to F shown in Table 4, respective components were mixed and stirred in a stirring bath adjusted to 20° C., and passed through a filter having a pore diameter of 0.5 μm to prepare the ink compositions D to F. The pigment in the ink compositions D to F has an average particle diameter of about 0.1 μm. And, Table 5 shows the viscosities and surface tensions of the ink compositions D to F at 25° C.

The same glass substrate as used in Embodiment 1 was mounted on a piezoelectric type ink-jet printer (MJ-800C; Seiko Epson Corp.; 720 dpi), and a color filter was produced using the ink compositions D to F.

And, the obtained color filter had a good pattern with a black matrix (BM) width of about 40 μm and a pattern width of about 140 μm of each formed colored layer. On this color filter, the maximum difference among pattern widths of the formed colored layer was about 10 μm.

Adhesion between the glass substrate and the each colored layer was also good as in Embodiment 1, and heat resistance, cold resistance and chemical resistance were equal to those of the colored layer of a conventional color filter formed by a dyeing method, a pigment dispersing method, an electrodeposition method or a printing method. Besides, optical properties of the colored layer were also same to those of the colored layer of the conventional color filter.

The cost of forming the colored layer was about one fifth of the cost of forming the colored layer of the conventional color filter.

Embodiment 3

In accordance with composition G shown in Table 4, respective components were mixed and stirred in a stirring bath adjusted to 20° C., and passed through a filter having a pore diameter of 0.5 μm to prepare the ink composition G. The pigment in the ink composition G has an average particle diameter of about 0.25 μm. And, Table 5 shows the viscosity and surface tension of the ink composition G at 25° C.

The same glass substrate (without the BM) as used in Embodiment 1 was mounted on a piezoelectric type ink-jet printer (MJ-800C; Seiko Epson Corp.; 720 dpi), and a color filter was produced using the ink compositions A to C and G.

And, the obtained color filter had a good pattern with a black matrix (BM) width of about 40 μm and a pattern width of about 140 μm of each formed colored layer. On this color filter, the maximum difference among pattern widths of the formed colored layer was about 10 μm.

Adhesion between the glass substrate and the each colored layer was good, and heat resistance, cold resistance and chemical resistance were equal to those of the colored layer of a conventional color filter formed by a dyeing method, a pigment dispersing method, an electrodeposition method or a printing method. Besides, optical properties of the colored layer were also same to those of the colored layer of the conventional color filter.

Embodiment 4

In accordance with compositions H to J shown in Table 4, respective components were mixed and stirred in a stirring bath adjusted to 20° C., and passed through a filter having a pore diameter of 0.5 μm to prepare the ink compositions H to J. The pigments in the ink compositions H to J have an average particle diameter of about 0.023 μm, about 0.020 μm and about 0.021 μm. And, Table 5 shows viscosities and surface tensions of the ink compositions H to J at 25° C.

A screen glass substrate (Nippon Electric Glass Co., Ltd.; with black matrix formed) for a 28-inch wide C-CRT was mounted on a piezoelectric type ink-jet printer (MJ-800C;

Seiko Epson Corp.; 720 dpi), and a pattern of a colored layer of a color filter was produced using the ink compositions H to J.

Thus, a color filter obtained had a pattern of each colored layer formed in black stripe holes having a pattern width of 150 μm. On this color filter, the maximum difference among pattern widths of the formed colored layer was about 10 μm.

Adhesion between the glass substrate and the each colored layer was good, and heat resistance, cold resistance and chemical resistance of the each colored layer were equal to those of a conventional colored layer formed by a photolitho method. Besides, optical properties such as luminous brightness of the colored layer were also same to those of the colored layer of the conventional color filter.

The cost of forming the colored layer including facilities investment was about 1/100 of the cost of forming the conventional colored layer. And, the amount of materials used for the colored layer was about 1/30.

Embodiment 5

In accordance with compositions K to M shown in Table 4, respective components were mixed and stirred in a stirring bath adjusted to 20° C., and passed through a filter having a pore diameter of 0.5 μm to prepare the ink compositions K to M. The pigments in the ink compositions K to M have an average particle diameter of about 0.023 μm, about 0.020 μm and about 0.021 μm. And, Table 5 shows viscosities and surface tensions of the ink compositions K to M at 25° C.

The same screen glass substrate as used in Embodiment 4 was mounted on a piezoelectric type ink-jet printer (MJ-800C; Seiko Epson Corp.; 720 dpi), and a pattern of a colored layer for a color filter was produced using the ink compositions K to M.

Thus, a color filter obtained had a pattern of each colored layer formed in black stripe holes having a pattern width of 150 μm. On this color filter, the maximum difference among pattern widths of the formed colored layer was about 10 μm.

Adhesion between the glass substrate and the each colored layer was good, and heat resistance, cold resistance and chemical resistance of the each colored layer were equal to those of a conventional colored layer formed by a photolitho method. Besides, optical properties such as luminous brightness of the colored layer were also same to those of the colored layer of the conventional color filter.

The cost of forming the colored layer including facilities investment was about 1/100 of the cost of forming the conventional colored layer. And, the amount of materials used for the colored layer was about 1/30.

Embodiment 6

In the same way as in Embodiment 4, the ink compositions H to J were prepared.

A screen glass substrate (Asahi Glass Co., Ltd.) for a 28-inch plasma display was mounted on a piezoelectric type ink-jet printer (MJ-800C; Seiko Epson Corp.; 720 dpi), and a pattern of a colored layer of a color filter was produced using the ink compositions H to J.

Thus, a color filter obtained had a pattern of each colored layer formed in rectangular holes having a pattern width of 150 μm. On this color filter, the maximum difference among pattern widths of the formed colored layer was about 10 μm.

Adhesion between the glass substrate and the each colored layer was good, and heat resistance, cold resistance and chemical resistance of the each colored layer were equal to those of a conventional colored layer formed by a photolitho method. Besides, optical properties such as luminous brightness of the colored layer were also same to those of the colored layer of the conventional color filter.

The cost of forming the colored layer including facilities investment was about one fifth of the cost of forming the conventional colored layer. And, the amount of materials used for the colored layer was about 1/20.

Embodiment 7

In accordance with compositions N to P shown in Table 4, respective components were mixed and stirred in a stirring bath adjusted to 20° C., and passed through a filter having a pore diameter of 0.5 μm to prepare the ink compositions N to P. The pigments in the ink compositions N to P have an average particle diameter of about 0.023 μm, about 0.020 μm and about 0.021 μm. And, Table 5 shows viscosities and surface tensions of the ink compositions N to P at 25° C.

A screen glass substrate (Asahi Glass Co., Ltd.) for a 28-inch plasma display was mounted on a piezoelectric type ink-jet printer (MJ-800C; Seiko Epson Corp.; 720 dpi), and a pattern of a colored layer of a color filter was produced using the ink compositions N to P.

Thus, a color filter obtained had a pattern of each colored layer formed in rectangular holes having a pattern width of 150 μm. On this color filter, the maximum difference among pattern widths of the formed colored layer was about 10 μm.

Adhesion between the glass substrate and the each colored layer was good, and heat resistance, cold resistance and chemical resistance of the each colored layer were equal to those of a conventional colored layer formed by a photolitho method. Besides, optical properties such as luminous brightness of the colored layer were also same to those of the colored layer of the conventional color filter.

The cost of forming the colored layer including facilities investment was about one fifth of the cost of forming the conventional colored layer. And, the amount of materials used for the colored layer was about 1/20.

Embodiment 8

In accordance with compositions Q to S shown in Table 4, respective components were mixed and stirred in a stirring bath adjusted to 20° C., and passed through a filter having a pore diameter of 0.5 μm to prepare the ink compositions Q to S. The pigments in the ink compositions Q to S have an average particle diameter of about 0.010 μm. And, Table 5 shows viscosities and surface tensions of the ink compositions Q to S at 25° C.

A wafer with a CCD (Charge Coupled Device) formed was mounted on a piezoelectric type ink-jet printer (MJ-800C; Seiko Epson Corp.; 720 dpi). And, to provide a pattern of each colored layer for a color filter in correspondence with each photo cell of the CCD, a pattern of a colored layer for the color filter was produced using the ink compositions Q to S.

Thus, a color filter obtained had a pattern of each colored layer having a pattern width of 150 μm. On this color filter, the maximum difference among pattern widths of the formed colored layer was about 10 μm.

Adhesion between the wafer and the each colored layer was good, and heat resistance, cold resistance and chemical resistance of the each colored layer were equal to those of a conventional colored layer formed by a photolitho method. Besides, optical properties of the colored layer were also same to those of the colored layer of the conventional color filter.

The cost of forming the colored layer including facilities investment was about 1/100 of the cost of forming the conventional colored layer. And, the amount of materials used for the colored layer was about 1/30.

Embodiment 9

In accordance with composition T shown in Table 4, respective components were mixed and stirred in a stirring bath adjusted to 20° C., and passed through a filter having a pore diameter of 0.5 μm to prepare the ink composition T.

The pigment in the ink composition T has an average particle diameter of about 0.025 μm. And, Table 5 shows the viscosity, surface tension and density of the ink composition T at 25° C.

A polyester-based OHP film was mounted on a piezoelectric type ink-jet printer (MJ-800C; Seiko Epson Corp.; 720 dpi). And, a character pattern was formed on the OHP by using the ink composition T.

Thus, the OHP film obtained has the character pattern having a pattern width of 250 μm. On this OHP film, the maximum difference among the formed character pattern widths was about 15 μm.

Adhesion between the OHP film and the colored layer forming the character patterns was good, and heat resistance, cold resistance and chemical resistance of the colored layer were equal to those of a conventional colored layer formed on an OHP film. Besides, optical properties of the colored layer such as OD were also same to those of the conventional colored layer.

The cost of forming the colored layer for the character patterns including facilities investment was about 1/100 of the cost of forming the conventional colored layer.

TABLE 4

| Ink Composition | Solvent (wt %) | Pigment (wt %) | Dispersant (wt %) | Additive (wt %) |
|---|---|---|---|---|
| A | Solmix AP-4 (94) | Phthalocyanine blue (3) | Polyvinyl butyral (3) | — |
| B | Solmix AP-4 (94) | Anthraquinone red (3) | Polyvinyl pyridine (3) | — |
| C | Methyl ethyl ketone (50)/ toluene (44) | Phthalocyanine green (3) | Polyester resin (3) | — |
| D | Water (92) | Phthalocyanine green (4)/ Benzidine yellow (1) | Polyvinyl acrylic pyrrolidone (3) | — |
| E | Water (91) | Perylene red (3) | Polyvinyl acrylic pyrrolidone (3) | Sodium dialkyl sulfosuccinate (3) |
| F | Water (93.5) | Phthalocyanine blue (2.7)/ Dioxazine violet (0.3) | Acrylic resin (3) | Fluorine-based surface active agent (0.5) |
| G | Solmix AP-4 (87) | Iron black (10) | Polyvinyl butyral (3) | — |
| H | Solmix AP-4 (88) | Cobalt blue (10) | Polyvinyl butyral (2) | — |
| I | Solmix AP-4 (90) | Red oxide (8) | Polyvinyl acrylic pyrrolidone (2) | — |
| J | Toluene (50)/ buthylacetate (38) | Cobalt green (10) | Acrylic resin (2) | — |
| K | Water (85) | Ultramarine blue (10) | Acrylic resin (2) | Sodium dialkyl sulfosuccinate (3) |
| L | Water (80) | Codmium sulfide (8) | Acrylic resin (2) | Polyether modified silicone oil (10) |
| M | Water (79) | Cobalt green (10) | Polyvinyl acrylic pyrrolidone (3) | Polyether modified silicone oil (8) |
| N | Solmix AP-4 (85) | Ultramarine blue (10) | Polyvinyl butyral (3) | Acrylic resin (2) |
| O | Solmix AP-4 (88) | Cadmium sulfide (8) | Acrylic resin (2) | Silicone resin (2) |
| P | Toluene (50)/ ethylacetate (36) | Cobalt green (10) | Polyvinyl acrylic pyrrolidone (3) | Polycarboxylic acid (1) |
| Q | Water (87) | Phthalocyanine green (5) | Polyvinyl acrylic pyrrolidone (5) | Sodium dialkyl sulfosuccinate (3) |
| R | Water (89) | Anthraquinone red (3) | Polyvinyl acrylic pyrrolidone (3) | Polyether modified silicone oil (5) |

TABLE 4-continued

| Ink Composition | Solvent (wt %) | Pigment (wt %) | Dispersant (wt %) | Additive (wt %) |
|---|---|---|---|---|
| S | Water (93.5) | Phthalocyanine blue (3) | Polyvinyl acrylic pyrrolidone (3) | Fluorine-based surface active agent (0.5) |
| T | Water (86.5) | Co—Fe—Cr black (10) | Acrylic resin (3) | Fluorine-based surface active agent (0.5) |

TABLE 5

| Ink composition | Viscosity (cp) | Surface tension (dyn/cm) |
|---|---|---|
| A | 4 | 22 |
| B | 5 | 22 |
| C | 5 | 28 |
| D | 8 | 29 |
| E | 3 | 31 |
| F | 3 | 31 |
| G | 9 | 22 |
| H | 7 | 22 |
| I | 8 | 22 |
| J | 5 | 28 |
| K | 6 | 30 |
| L | 10 | 30 |
| M | 15 | 32 |
| N | 12 | 30 |
| O | 7 | 27 |
| P | 12 | 30 |
| Q | 7 | 36 |
| R | 4 | 40 |
| S | 3 | 42 |
| T | 11 | 28 |

As described above, when the ink composition according to the present invention is used, the pigment is uniformly dispersed in the droplets adhered onto the surface of glass, ceramics or polyester resin of a base material. Therefore, a fine pattern can be formed on the surface of glass, ceramics or polyester resin by the ink-jet method without forming a to-be-colored layer.

According to the pattern forming method of the present invention, a pattern is formed by the ink-jet method using the ink composition containing the pigment which is uniformly dispersed in the droplets adhered onto the surface of glass, ceramics or polyester resin of a base material, so that a fine pattern having high reliability can be formed indirectly onto the surface of glass, ceramics or polyester resin of the base material. Therefore, the number of processes and facilities investment can be decreased and the pattern can be formed on the base material economically.

Besides, since the color filter of the present invention has the colored layer formed of the pigment adhered onto the surface of a base material by the ink-jet method, practical reliability in optical resistance and water resistance and cost efficiency can be improved.

What is claimed is:

1. A method of forming a pattern on a base material selected from glass and ceramic by an ink jet method, comprising the steps of:
   preparing an ink composition by uniformly dispersing a pigment in a solvent with a dispersant for enhancing an affinity between the solvent and the pigment;
   ejecting the ink composition onto a surface of a base material through a nozzle by the ink jet method to form a droplet of the ink composition on the surface of the base material, wherein the droplet is formed such that the ratio of a volume of the droplet to a surface area of the droplet, except an area contacting the base material, is substantially maximized;
   evaporating the solvent from the droplet while keeping the ratio substantially at the maximum; and
   adhering the pigment onto the base material to form a pattern.

2. The method of claim 1, wherein the method further comprises a step of filtering the ink composition to control an average of the pigment in the ink composition to from 0.001 $\mu$m to 0.3 $\mu$m.

3. The method of claim 1, wherein the base material is a glass substrate and the ink composition is controlled to have a surface to tension of 20 dyn/cm to 32 dyn/cm at 25° C. and viscosity of 3 cp to 20 cp at 25° C.

4. The method of claim 2, wherein the base material is a glass substrate and the ink composition is controlled to have a surface to tension of 20 dyn/cm to 32 dyn/cm at 25° C. and viscosity of 3 cp to 20 cp at 25° C.

5. A method of forming a pattern on a base material selected from glass an ceramic by an ink jet method, comprising the steps of:
   preparing an ink composition having a surface tension of 20 dyn/cm to 50 dyn/cm at 25° C. and viscosity of 1.5 cp to 20 cp at 25° C., by uniformly dispersing a pigment in a solvent with a dispersant for enhancing an affinity between the solvent and the pigment;
   ejecting droplets of the ink composition through a nozzle using an ink-jet method onto the base material, wherein each of the droplets is formed such that the ratio of a volume of the droplet to a surface area of the droplet, except an area contacting the base material, is substantially maximized; and
   evaporating the solvent in the ink composition of the droplets, while substantially keeping the ratio of the volume to the surface area of the droplet, and thereby adhering the pigment on the base material to form a pattern.

6. The method of claim 5, wherein the method further comprises a step of filtering the ink composition to control an average of the pigment in the ink composition to from 0.001 $\mu$m to 0.3 $\mu$m.

7. The method of claim 5, wherein the method further comprises an additive for controlling the surface tension of the droplet.

8. The method of claim 5, wherein said base material is a glass substrate and said ink composition is controlled to have a surface tension of 20 dyn/cm to 32 dyn/cm at 25° C. and viscosity of 3 cp to 20 cp at 25° C.

9. The method of claim 5, wherein said solvent is water, said pigment is an organic substance, and said dispersant is at least one member selected from a group consisting of acrylic resin, polyvinyl acrylic pyrrolidone and polyvinyl alkyl pyrrolidone.

10. The method of claim 5, wherein said solvent is water, said pigment is an inorganic substance, and said dispersant is at least one member selected from a group consisting of acrylic resin and polyvinyl acrylic pyrrolidone.

11. The method of claim 5, wherein said solvent is an organic solvent or a mixture of water and an organic solvent, said pigment is an organic substance, and said dispersant is at least one member selected from a group consisting of polyvinyl butyral, acrylic resin, polyvinyl pyridine, polyamide resin, phenol resin, polyvinyl acrylic pyrrolidone, polyurethane and polyester resin.

12. The method of claim 5, wherein said solvent is an organic solvent or a mixture of water and an organic solvent, said pigment is an inorganic substance, and said dispersant is at least one member selected from a group consisting of polyvinyl butyral, acrylic resin, and polyvinyl acrylic pyrrolidone.

13. A method of manufacturing a color filter comprising a substrate selected from a glass substrate or ceramic substrate and a color layer formed on the substrate, said method comprising the steps of:

preparing an ink composition comprising a pigment, a solvent, and a dispersant such that the ink composition has a surface tension of 20 dyn/cm to 50 dyn/cm at 25° C. and viscosity of 1.5 cp to 20 cp at 25° C.;

ejecting the ink composition through a nozzle using the ink jet method onto the substrate to form a droplet of the ink composition adhered on the substrate, the droplet being formed such that the ratio of a volume of the droplet to a surface area of the droplet, except an are contacting the substrate, is substantially at a maximum; and evaporating the solvent in the ink composition of the droplets while keeping the ratio substantially at a maximum, thereby forming a pattern of the coloring layer which is adhered on the substrate.

14. The method of claim 13, wherein said substrate is a glass substrate and said ink composition has a surface tension of 20 dyn/cm to 32 dyn/cm at 25° C. and viscosity of 3 cp to 20 cp at 25° C.

15. The method of claim 13, wherein said substrate is a wafer on which a charge coupled device is formed.

16. A display unit having a color filter manufactured by the method of claim 13.

17. A solid state pickup device having a color filter manufactured by the method of claim 13.

18. A method of manufacturing a color filter comprising a glass substrate and a color layer formed on the glass substrate, said method comprising the steps of:

preparing an ink composition comprising a pigment, a solvent, and a dispersant such that the ink composition has a surface tension of 20 dyn/cm to 32 dyn/cm at 25° C. and viscosity of 3 cp to 20 cp at 25°0 C.;

ejecting the ink composition through a nozzle using the ink jet method onto the glass substrate to form a droplet of the ink composition, wherein a shape of the droplet is formed such that a ratio of a surface area of the droplet, except an area contacting the substrate, to a volume of the droplet is substantially minimized; and evaporating uniformly the solvent in the ink composition from the droplets while keeping the ratio substantially at a minimum, thereby forming a pattern of the coloring layer which is adhered on the substrate.

* * * * *

UNITED STATES PATENT AND TRADEMARK OFFICE
CERTIFICATE OF CORRECTION

PATENT NO. : 6,416,174 B1
DATED : July 9, 2002
INVENTOR(S) : Ito et al.

It is certified that error appears in the above-identified patent and that said Letters Patent is hereby corrected as shown below:

Column 18,
Line 29, change "surface to tension" to -- surface tension --.
Line 33, change "surface to tension" to -- surface tension --.
Line 36, change "glass an ceramic" to -- glass and ceramic --.

Column 19,
Line 33, change "except an are" to -- except an area --.

Column 20,
Line 22, change "25º0 C." to -- 25º C. --.

Signed and Sealed this

Twenty-eighth Day of January, 2003

JAMES E. ROGAN
*Director of the United States Patent and Trademark Office*